G. H. HILL, DEC'D.
H. T. HILL, ADMINISTRATRIX.
CONTROL FOR ELECTRIC HEATING DEVICES.
APPLICATION FILED MAR. 31, 1917.
1,306,542.
Patented June 10, 1919.
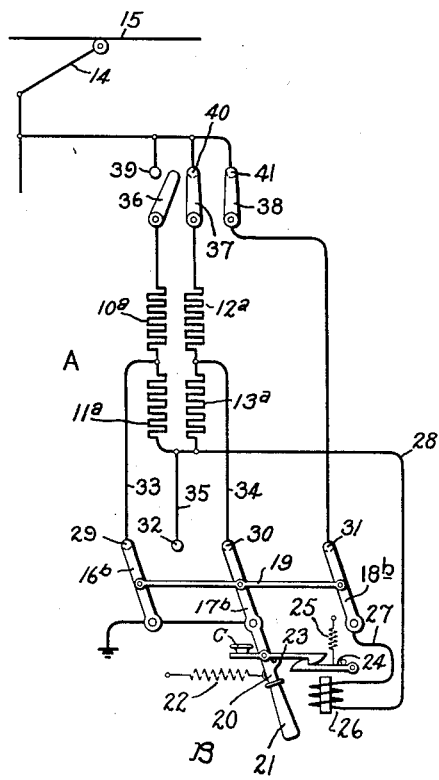
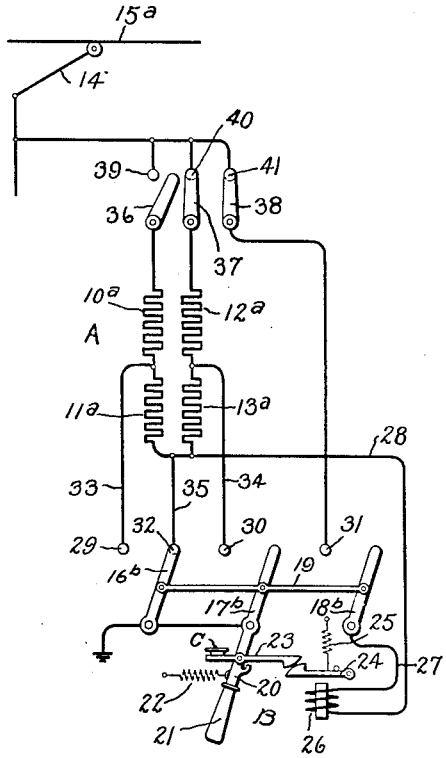
Inventor:
George H. Hill, Deceased,
Hazel T. Hill, Administratrix.
by
Attorney.

UNITED STATES PATENT OFFICE.

GEORGE H. HILL, DECEASED, LATE OF SCHENECTADY, NEW YORK, BY HAZEL T. HILL, ADMINISTRATRIX, OF SCHENECTADY, NEW YORK, ASSIGNOR TO GENERAL ELECTRIC COMPANY, A CORPORATION OF NEW YORK.

CONTROL FOR ELECTRIC HEATING DEVICES.

1,306,542.  Specification of Letters Patent.  Patented June 10, 1919.

Application filed March 31, 1917. Serial No. 158,993.

*To all whom it may concern:*

Be it known that GEORGE H. HILL, deceased, late a citizen of the United States, and a resident of Schenectady, in the county of Schenectady, State of New York, during his lifetime invented certain new and useful Improvements in Controls for Electric Heating Devices, and that I, HAZEL T. HILL, duly-appointed administratrix of the estate of the said GEORGE H. HILL, do hereby declare to the best of my knowledge and belief that the following specification, taken in connection with the accompanying drawing, is a clear, true, and complete description of said improvements.

This invention relates to a heating device and means associated therewith for maintaining substantially constant current in the element or elements of the heating device notwithstanding a change in voltage of the electric energy supply.

The invention is particularly applicable to electric vehicles, though it will be understood that the same is not limited to this particular application. It has been found that under some conditions, electric vehicles can be advantageously operated at different voltages. For example, the voltage at which the operating current may be supplied to the car is necessarily limited within city limits and may be supplied for instance at 600 volts, whereas the car may be advantageously operated between city limits at a much higher voltage, for example, at 1200 volts. It is obvious, however, that when the car passes from the energy supply of lower voltage to that of higher voltage, the electric heating device with which the cars are usually provided will be promptly injured if because of any lack of attention on the part of the operator the circuit connections to the heating device are not changed. In accordance with the present invention, under such conditions, the connections to the heating device are promptly and automatically shifted so as to maintain substantially constant current in the elements of the heating device, notwithstanding an increase in voltage of the supply circuit.

The invention will be best understood by reference to the accompanying drawings, in which is shown one embodiment thereof, and in which Figure 1 is a diagrammatic view showing the heating device connected for operation at a relatively low voltage and Fig. 2 is a similar view but showing the connections arranged for operating the heating device at the higher voltage.

Referring now to the drawings, A is an electric heating device which is preferably provided with a plurality of heating elements which are indicated by the numerals $10^a$, $11^a$, $12^a$ and $13^a$. In the embodiment of the invention here shown, the heating device is carried by an electric vehicle to which electric energy is conveyed by means of a trolley 14 of usual form, which engages a trolley conductor 15 which, with the parts in the position shown in Fig. 1, is assumed to be carrying a current having a voltage of relatively low value, for example, 600 volts, while the corresponding conductor $15^a$ in Fig. 2 is assumed to be carrying a current of a higher voltage, for example, 1200 volts. The connections to the heating device are preferably controlled by a switch B which is here shown as a three-pole double throw switch provided with arms $16^b$, $17^b$, and $18^b$, suitably pivoted and connected together by a bar 19. One of the switch arms $17^b$ is provided with an extension 20 which is in turn provided with a handle 21 by which the switch may be manually thrown to the position shown in Fig. 1. The switch is biased to the position shown in Fig. 2 by a retractile spring 22. When the switch has been thrown to the position shown in Fig. 1, it is held in this position by a latch 23, pivoted on the extension 20, and engaging a latch in the form of an armature 24 which is drawn into engagement with the latch 23 by a spring 25. The armature 24 is disengaged from the latch 23 by a magnet 26, one terminal of which is connected by a conductor 27 to the switch arm $18^b$, and the other terminal of which is connected by a conductor 28 to one terminal of each of the heating elements $11^a$ and $13^a$.

Preferably, a manually operated member C is provided for disengaging the latches 23 and 24, which is intended to be operated by the motorman when the car passes from a section of low voltage to one of higher voltage.

The arms $16^b$, $17^b$ and $18^b$ of the switch B are arranged to engage stationary contacts 29, 30 and 31 respectively, when the switch is in the position shown in Fig. 1 and when the switch is in the position shown in Fig. 2 the arm 16ᵇ engages a stationary contact 32. The heating elements 10ᵃ and 11ᵃ are electrically connected together as are the elements 12ᵃ and 13ᵃ, and a point intermediate between the elements 10ᵃ and 11ᵃ is connected by a conductor 33 to the stationary contact 29, while a point intermediate the elements 12ᵃ and 13ᵃ is connected by a conductor 34 to the stationary contact 30. The stationary contact 32 is connected to the conductor 28 by a conductor 35, and accordingly to one of the terminals of each of the heating elements 11ᵃ and 13ᵃ.

The circuits to the heating device are controlled by switches which are shown as three in number, 36, 37 and 38, which may be manually operated and which engage corresponding stationary contacts 39, 40 and 41.

The operation of the device embodying the invention, which will be readily understood from the foregoing description is as follows: When the heating device is to be operated from a supply circuit of relatively low voltage, the operator throws the switch B to the position shown in Fig. 1 and closes the switch 38. A circuit is thereby closed from the trolley 14, contact 41, switch 38, contact 31, switch arm 18ᵇ, magnet 26, conductor 28, and through the heating elements 11ᵃ and 13ᵃ in parallel to the conductors 33 and 34 respectively from which the circuit is completed through the switch B to ground. Additional degrees of heat may be obtained in the heating device by closing either or both of the switches 36 and 37 by which one or both of the elements 10ᵃ and 12ᵃ are connected in parallel with the other heating elements as will be readily understood. It will be observed that the circuit for the heating elements at this time includes the magnet 26, which is so designed, however, that it will not attract the armature 24 with the amount of current that is received from a trolley conductor of relatively low voltage. Now, should the trolley engage a conductor of higher voltage, for example, double the voltage of that assumed in Fig. 1, and should the motorman neglect to disengage the latches 23 and 24 thereby permitting the switch B to move to the position shown in Fig. 2, then the magnet 26, which is so designed that it will attract the armature 24 with the increase in current resulting from the higher voltage, releases the switch B which will be thrown to the position shown in Fig. 2 by the spring 22. If both of the switches 36 and 37 are at this time open, then the heating device will be entirely deprived of current. If either or both of these switches are closed, a circuit will be completed either through the heating elements 10ᵃ and 11ᵃ in series, or the elements 12ᵃ and 13ᵃ in series, or through the two groups in series parallel relation, and through conductor 35, contact 32, switch arm 16ᵇ, to the ground. The various elements of the heating device have substantially the same resistance and it will be observed, therefore, that each element, when active, will be operated at substantially the same current regardless of whether the trolley conductor is carrying a current of high or low voltage.

In accordance with the requirements of the patent statutes, what is considered the best form of this invention is described. It will be understood, however, that changes can be made without departing from the spirit of the invention.

What is claimed as new and desired to be secured by Letters Patent of the United States, is:—

1. The combination with a supply circuit energized at different potentials, of a plurality of heating elements connected thereto, means for changing the connections of the heating elements to said circuit so as to vary the amount of heat produced at one of said potentials and means for automatically shifting the connections upon a change of voltage of the supply circuit so that substantially the same amount of current passes through the heating elements at the different voltages.

2. The combination with a supply circuit energized at different potentials, of a plurality of heating elements connected thereto, means for connecting more or less of the heating elements in parallel to said circuit at one voltage so as to vary the amount of heat produced by said potentials and means for automatically shifting the connections upon a change of voltage of the supply circuit so that substantially the same amount of current passes through the heating elements at the different voltages.

3. The combination with a supply circuit energized at different potentials, of an electric heater connected thereto comprising a plurality of sections each consisting of a plurality of heating elements, means for connecting the heating elements in parallel to said circuit at one voltage and means for automatically connecting one or more of the sections to the line with the heating elements thereof in series, so that substantially the same amount of current passes through the heating elements at the different voltages.

4. The combination with a supply circuit energized at different potentials, of an electric heater connected thereto comprising a plurality of sections each consisting of a plurality of heating elements, means for connecting the heating elements in parallel to said circuit at one voltage and means for automatically connecting the sections to the line in parallel with the heating elements of each section in series upon a change of voltage in the supply circuit so that substantially the same amount of current passes through the heating elements at the different voltages.

5. The combination with a supply circuit energized at different potentials, of a plurality of heating elements connected thereto, means for changing the connections of the heating elements to said circuit so as to vary the amount of heat produced at one of said potentials, a manually operated switch normally in a position to make the high voltage connections, means for mechanically locking the switch in the low voltage position and means for automatically releasing the switch upon a change of voltage of the circuit from low to high.

6. The combination with a supply circuit energized at different potentials, of a plurality of heating elements connected thereto, switches for controlling individual heating elements so as to connect more or less of the heating elements in parallel to said circuit at the low voltage, a manually operated switch normally in a position to make the high voltage connection, means for mechanically locking the switch in its low voltage position and means for automatically releasing the switch upon a change in voltage of the supply circuit from low to high.

In witness whereof, I have hereunto set my hand this 30th day of March, 1917.

HAZEL T. HILL,
*Administratrix of the estate of George H. Hill, deceased.*